US009915394B2

(12) United States Patent
Chen

(10) Patent No.: US 9,915,394 B2
(45) Date of Patent: Mar. 13, 2018

(54) POSITIONABLE LIFT STAND

(71) Applicant: Wistron Corporation, New Taipei (TW)

(72) Inventor: Guang-zhao Chen, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 0 days.

(21) Appl. No.: 14/805,062

(22) Filed: Jul. 21, 2015

(65) Prior Publication Data
US 2016/0091135 A1 Mar. 31, 2016

(30) Foreign Application Priority Data

Sep. 29, 2014 (CN) .................... 2014 2 0568289 U

(51) Int. Cl.
*A47F 5/00* (2006.01)
*F16M 11/28* (2006.01)
*F16M 11/10* (2006.01)

(52) U.S. Cl.
CPC ............. *F16M 11/28* (2013.01); *F16M 11/10* (2013.01); *F16M 2200/048* (2013.01)

(58) Field of Classification Search
CPC  F16M 11/28; F16M 11/10; F16B 3/04; F16B 19/002; F16B 19/00; F16B 21/12; F16B 2021/14; F16B 21/125
USPC ..... 248/122.1, 123.11, 125.11, 125.2, 125.8, 248/125.9, 161, 162.1, 157, 423, 407; 361/679.05; 411/513, 515, 316
See application file for complete search history.

(56) References Cited

U.S. PATENT DOCUMENTS

| 154,536 | A | * | 8/1874 | Wolf | F16L 37/26 285/305 |
| 1,864,424 | A | * | 6/1932 | Franklin | F16B 21/12 411/513 |
| RE19,452 | E | * | 2/1935 | Peterson | F16B 39/04 411/530 |
| 2,047,295 | A | * | 7/1936 | Sipos | F16B 39/04 411/514 |
| 2,130,263 | A | * | 9/1938 | Christophersen | A44B 3/08 24/100.5 |

(Continued)

FOREIGN PATENT DOCUMENTS

TW      M396055 U     1/2011

*Primary Examiner* — Kimberly T Wood
(74) *Attorney, Agent, or Firm* — McClure, Qualey & Rodack, LLP

(57) ABSTRACT

A positionable lift stand includes a support structure defining a first positioning hole, a sliding member slidably engaged with the support structure and defines a second positioning hole, an elastic member, and a fixing member. The elastic member is connected between the support structure and the sliding member, while provides a restoring force enabling the sliding member to move against the support structure. The fixing member passes through the first positioning hole of the support structure and the second positioning hole of the sliding member. By utilizing the fixing member and various positioning holes associated with the lift stand, the lift stand can be fixedly held to occupy the least amount of space for packaging or storing purpose. Such attribute is achieved by using fewer parts and processing steps, which means fewer parts need to be manufactured, more cost savings, and less assembling time.

9 Claims, 11 Drawing Sheets

(56) References Cited

U.S. PATENT DOCUMENTS

| | | | | |
|---|---|---|---|---|
| 2,147,163 A * | 2/1939 | Jimerson | B25B 23/0035 | 279/97 |
| 2,162,811 A * | 6/1939 | Guy | F16B 39/04 | 411/514 |
| 2,246,359 A * | 6/1941 | Jelinek | B62D 33/0273 | 16/381 |
| 2,291,847 A * | 8/1942 | Taylor | F16B 21/12 | 174/182 |
| 2,308,605 A * | 1/1943 | Hillstrom | F16B 39/04 | 411/210 |
| 2,401,976 A * | 6/1946 | Simpson | F16B 21/125 | 411/514 |
| 6,702,238 B1 * | 3/2004 | Wang | F16M 11/10 | 248/125.8 |
| 6,712,321 B1 * | 3/2004 | Su | F16M 11/10 | 248/123.11 |
| 6,905,099 B2 * | 6/2005 | Sung | F16M 11/04 | 248/146 |
| 6,918,564 B2 * | 7/2005 | Yen | F16M 11/24 | 248/123.11 |
| 6,994,303 B2 * | 2/2006 | Lin | F16M 11/24 | 248/122.1 |
| 7,036,787 B1 * | 5/2006 | Lin | F16M 11/10 | 248/123.11 |
| 7,374,139 B2 * | 5/2008 | Tsai | F16M 11/28 | 248/157 |
| 7,413,150 B1 * | 8/2008 | Hsu | F16M 11/04 | 248/123.11 |
| 7,490,796 B2 * | 2/2009 | Kim | F16M 11/10 | 248/123.11 |
| 7,712,711 B2 * | 5/2010 | Jang | F16M 11/10 | 248/125.8 |
| 7,722,003 B2 * | 5/2010 | Ishizaki | F16M 11/24 | 248/125.1 |
| 8,016,252 B2 * | 9/2011 | Su | F16M 11/00 | 248/125.8 |
| 8,074,948 B2 * | 12/2011 | Zou | F16M 11/04 | 248/123.11 |
| 8,427,818 B2 * | 4/2013 | Liu | F16M 11/046 | 248/125.8 |
| 9,279,537 B2 * | 3/2016 | Hung | F16M 11/18 | |
| 2003/0234332 A1 * | 12/2003 | Yen | F16M 11/24 | 248/404 |
| 2006/0038092 A1 * | 2/2006 | Choi | F16M 11/105 | 248/121 |
| 2006/0219849 A1 * | 10/2006 | Chiu | F16M 11/04 | 248/125.8 |
| 2006/0231697 A1 * | 10/2006 | Hsu | F16M 11/24 | 248/125.9 |
| 2007/0034756 A1 * | 2/2007 | Tsai | F16M 11/28 | 248/161 |
| 2007/0194182 A1 * | 8/2007 | Lee | F16M 11/04 | 248/125.9 |
| 2007/0205340 A1 * | 9/2007 | Jung | F16M 11/24 | 248/125.9 |
| 2008/0023599 A1 * | 1/2008 | Lin | F16M 11/00 | 248/122.1 |
| 2008/0237411 A1 * | 10/2008 | Kim | F16M 11/04 | 248/122.1 |
| 2009/0101770 A1 * | 4/2009 | Sui | F16M 11/00 | 248/161 |
| 2013/0233984 A1 * | 9/2013 | Huang | F16M 11/046 | 248/162.1 |

\* cited by examiner

POSITIONABLE LIFT STAND

CROSS-REFERENCES TO RELATED APPLICATIONS

This non-provisional application claims priority under 35 U.S.C. § 119(a) on Patent Application No. 201420568289.2 filed in China, P.R.C. on 2014 Sep. 29, the entire contents of which are hereby incorporated by reference.

BACKGROUND

Technical Field

The instant disclosure relates to a lift stand, in particular, to a positionable lift stand.

Related Art

With the advancement in technology and computerization, along with the popularization of thin-type electronic visual displays, various types of display can be seen in places such as business stores, work locations, or residential complexes. These displays allow the users to control or view what is being displayed. In order to meet various user requirements or adapt to operating environments, displays are often in need of adjustable stands, so that the user can adjust the position or height of the display accordingly.

Several types of support structure for accommodating the display are available in the market. These support structures can further work with lift stands to adjust the height of the support structures. However, some lift stands are not fitted with stroke fixing capability. That is, the lift stand is typically left at its maximum reach, which adversely increases the packaging size. Furthermore, if the lift stand is pre-oriented at its maximum reach, the lift stand may start to yield due to the weight of the display during the assembling process, causing inconvenience for the user.

To minimize the packaging size, some lift stands would pair up with stroke fixing devices. Such option would save more space for shipping purpose. However, the majority of stroke fixing devices have complex structures. For instance, a conventional stroke fixing element is made up of three to five components. This fact means extra cost would be spent for molding the parts, along with additional time needed in labor and assembling process.

SUMMARY

In light of above, the instant disclosure provides a positionable lift stand, which comprises: a support structure; a sliding member; an elastic member; and a fixing member. A first positioning hole is formed on the support structure. The sliding member is slidably disposed on the support structure and defines a second positioning hole. The elastic member is connected between the support structure and the sliding member, in providing a restoring force that enables the sliding member to move slidably against the support structure. The fixing member passes through the first positioning hole and the second positioning hole of the support structure and the sliding member, respectively.

Based on the above-described structural configuration, the sliding member of the lift stand of the instant disclosure is actuated by the restoring force of the elastic member, such that the sliding member is movable in an up-and-down fashion relative to the support structure for adjusting the height of the display. When the lift stand is to be packaged, the sliding member is forced to slide to the bottom end of the support structure. Next, the fixing member is used to pass through the first positioning hole and the second positioning hole of the support structure and the sliding member, respectively. Thus, the position of the sliding member becomes fixed and would not back-slide upwardly under the restoring force of the elastic member. Therefore, by utilizing the fixing member and positioning holes formed penetratingly through respective components of the lift stand, the lift stand could be easily kept in occupying least amount of space for packaging or storing purpose. Such attribute is achieved by using fewer parts and requires less manufacturing processes. In doing so, the number of parts necessary to assemble the lift stand can be reduced, with more cost savings and less assembling time.

Detailed descriptions of the characteristics and the advantages of the instant disclosure are included in the following embodiments. The technical content and the implementation of the instant disclosure should be readily apparent to any person skilled in the art based on provided descriptions. The purposes and the advantages of the instant disclosure should be readily understood by any person skilled in the art with reference to the specification, claims, and drawings of the instant disclosure.

DETAILED DESCRIPTION

Figure 1:
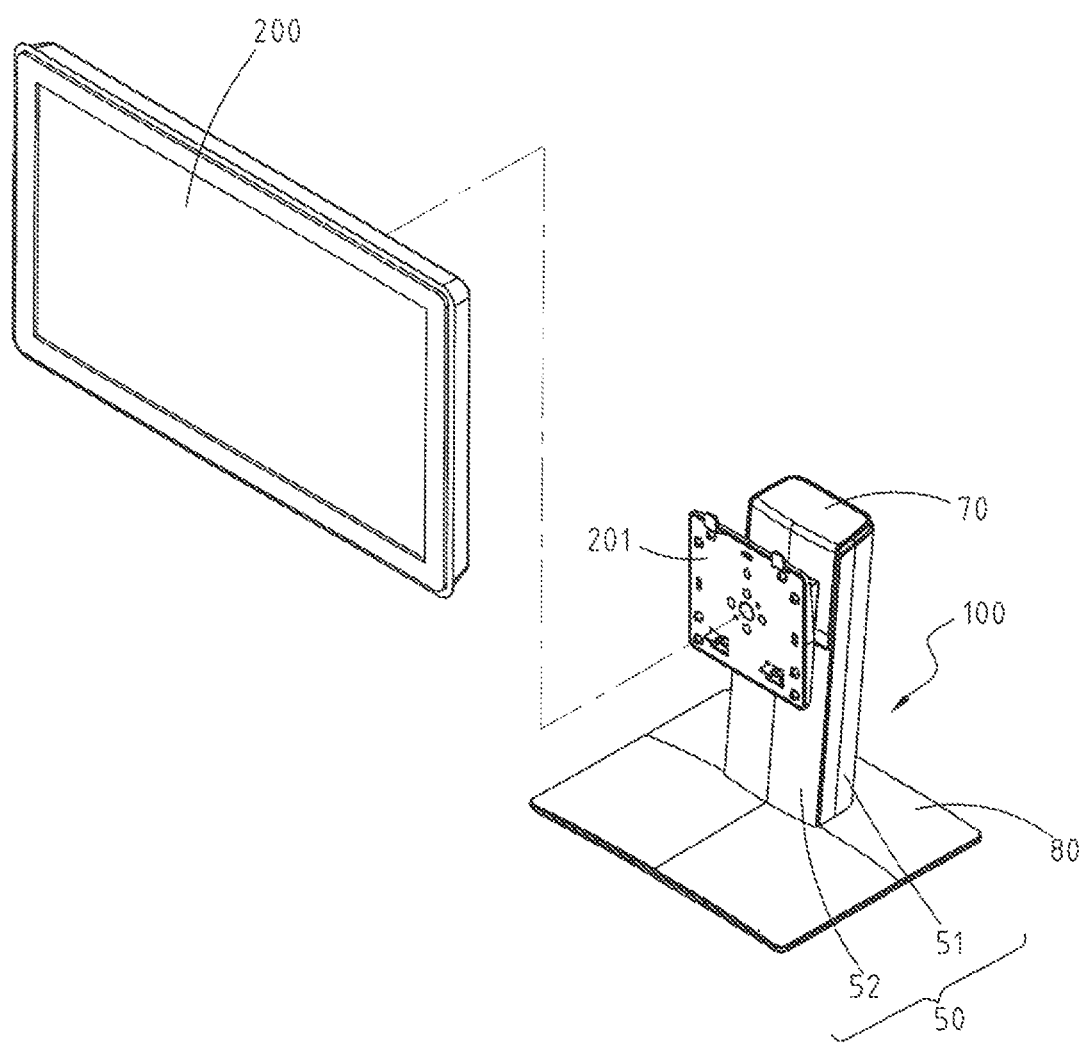
FIG. 1 is a schematic view of a lift stand in use for an embodiment of the instant disclosure.
Figure 2:
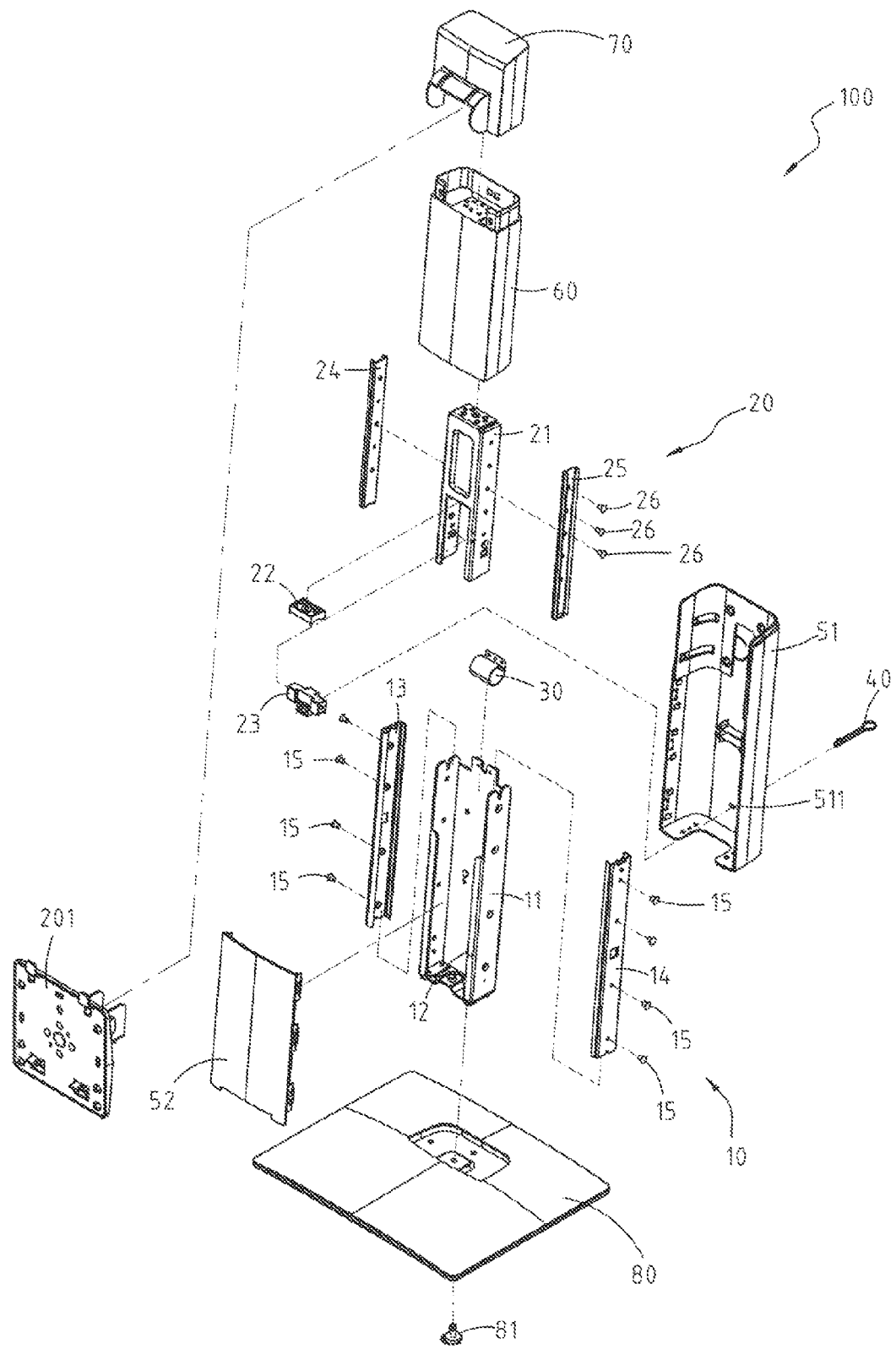
FIG. 2 is an exploded view of the lift stand for an embodiment of the instant disclosure.
Figure 3:
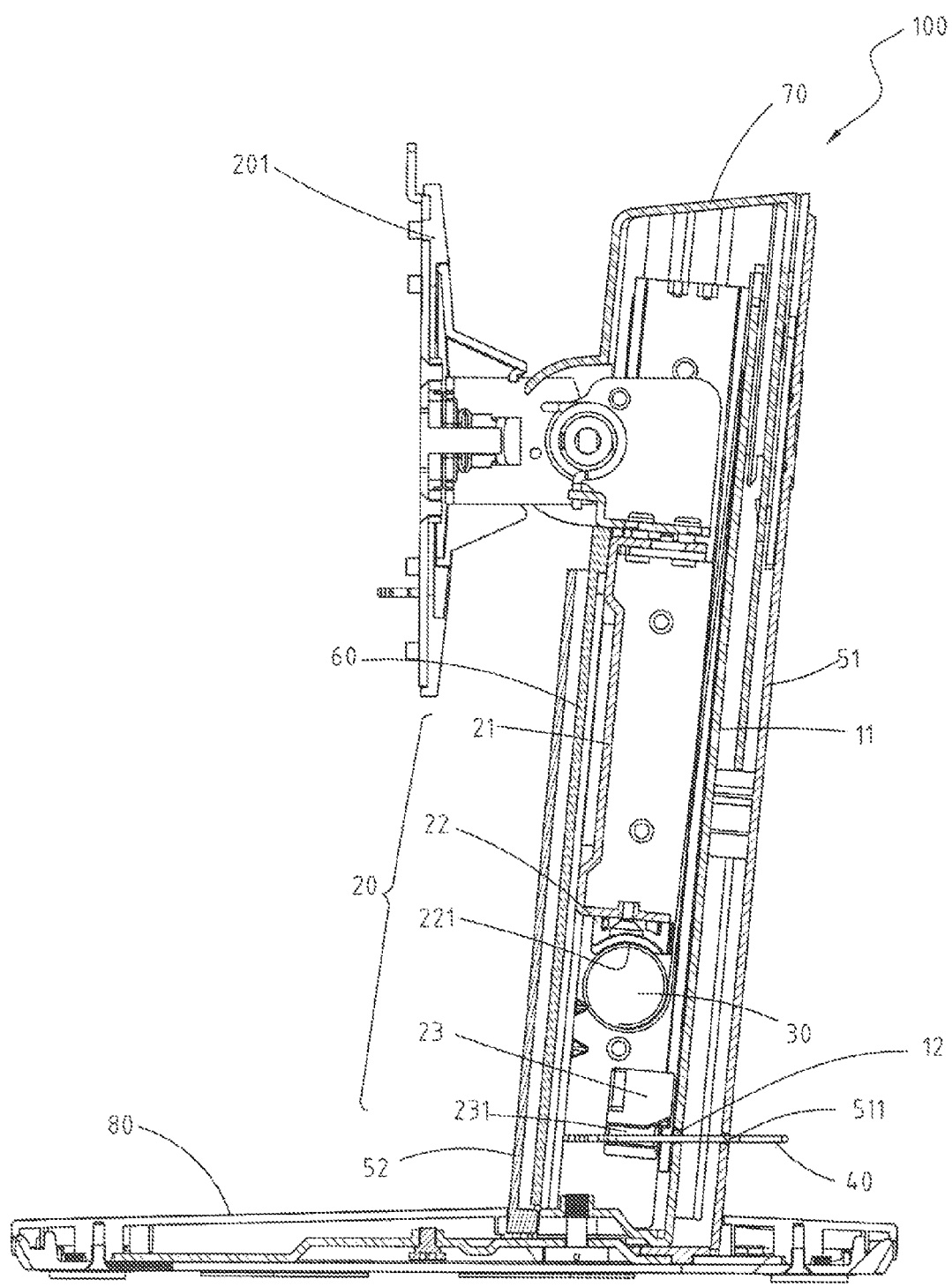
FIG. 3 is a cross-sectional view of the lift stand for an embodiment of the instant disclosure.
Figure 4:
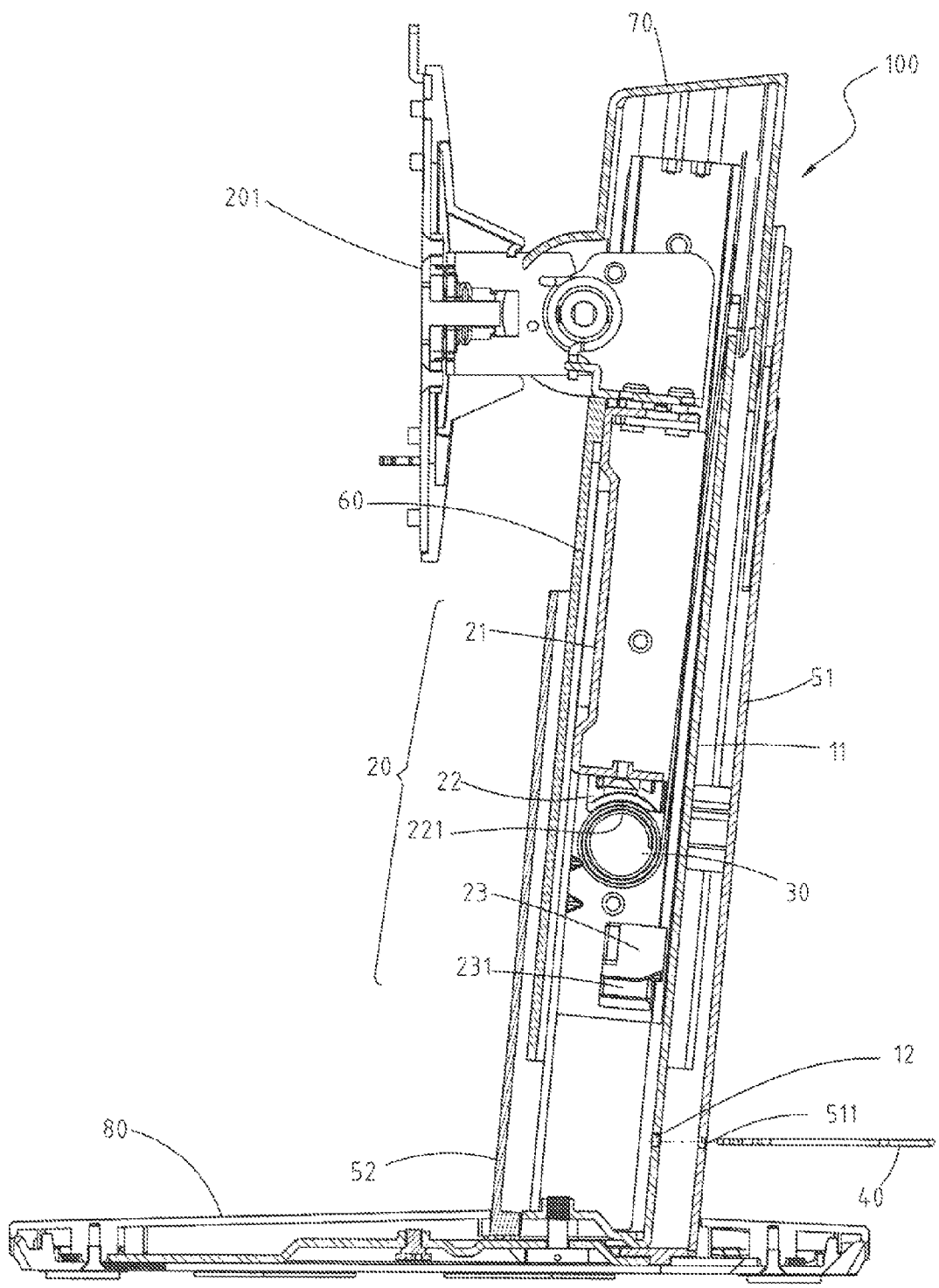
FIG. 4 is another cross-sectional view of the lift stand for an embodiment of the instant disclosure.
Figure 5:
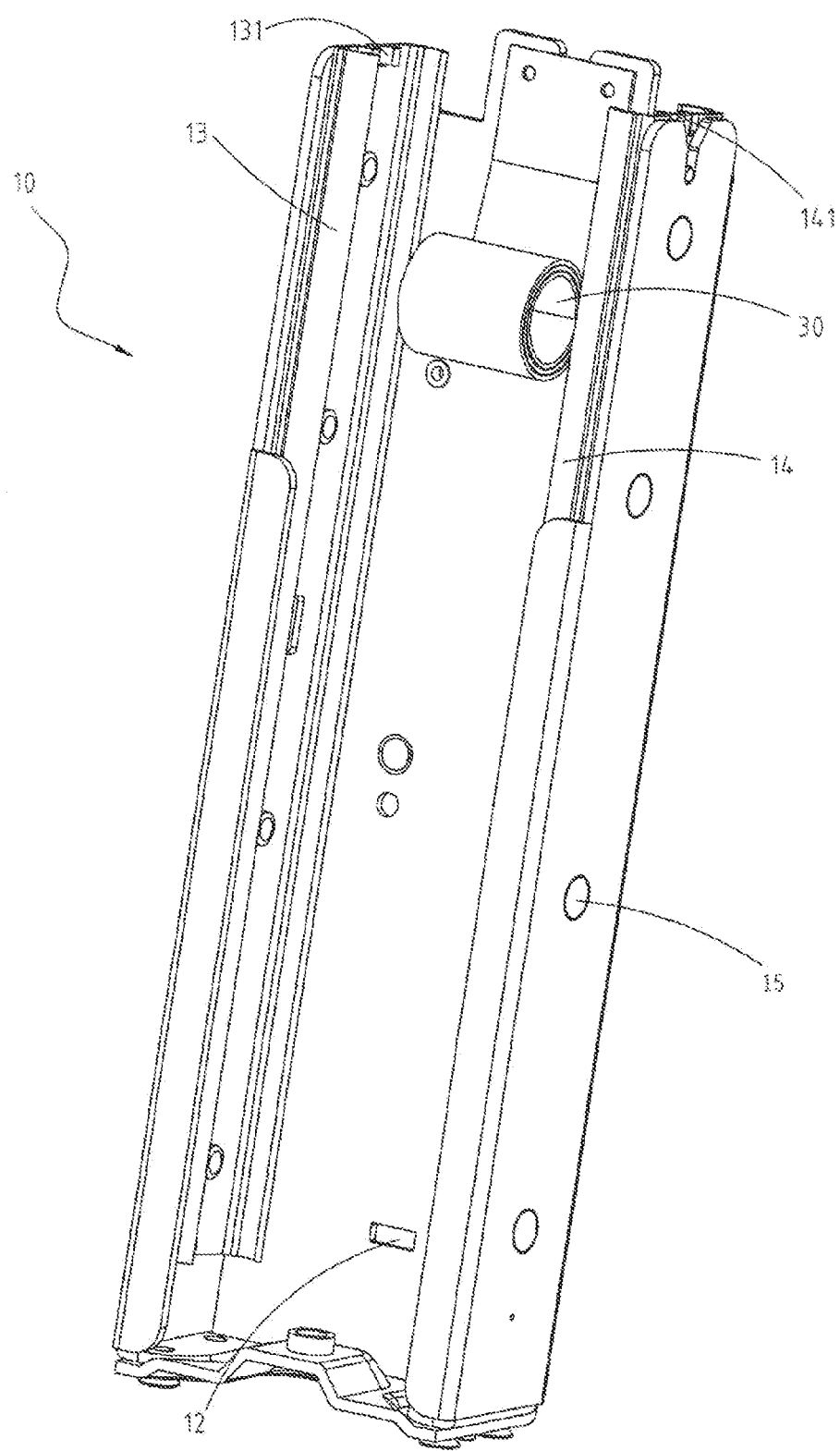
FIG. 5 is a perspective view of a support structure for an embodiment of the instant disclosure.
Figure 6:
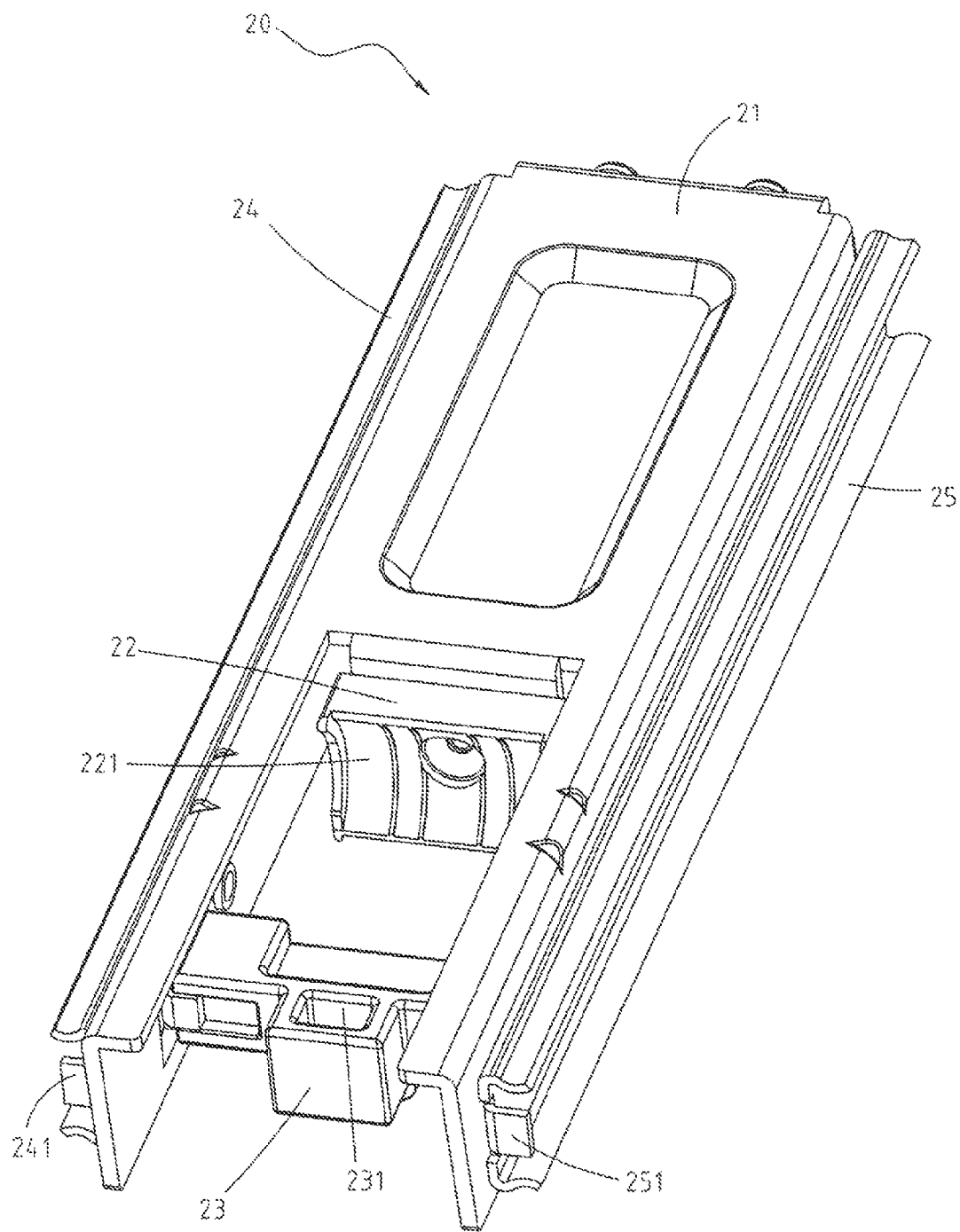
FIG. 6 is a perspective view of a sliding member for an embodiment of the instant disclosure.
Figure 7:
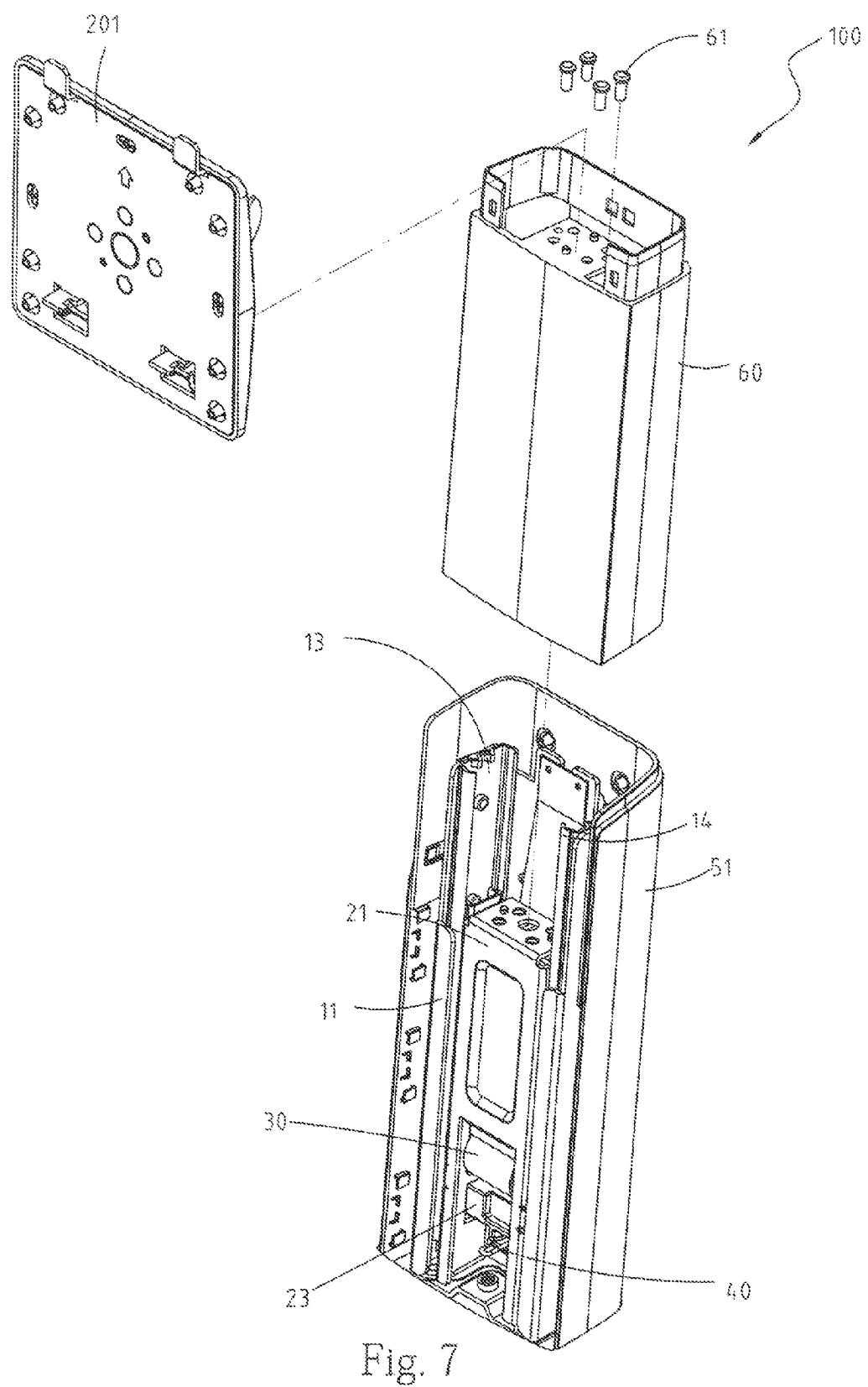
FIG. 7 is a schematic view of assembling the lift stand for an embodiment of the instant disclosure.
Figure 8:
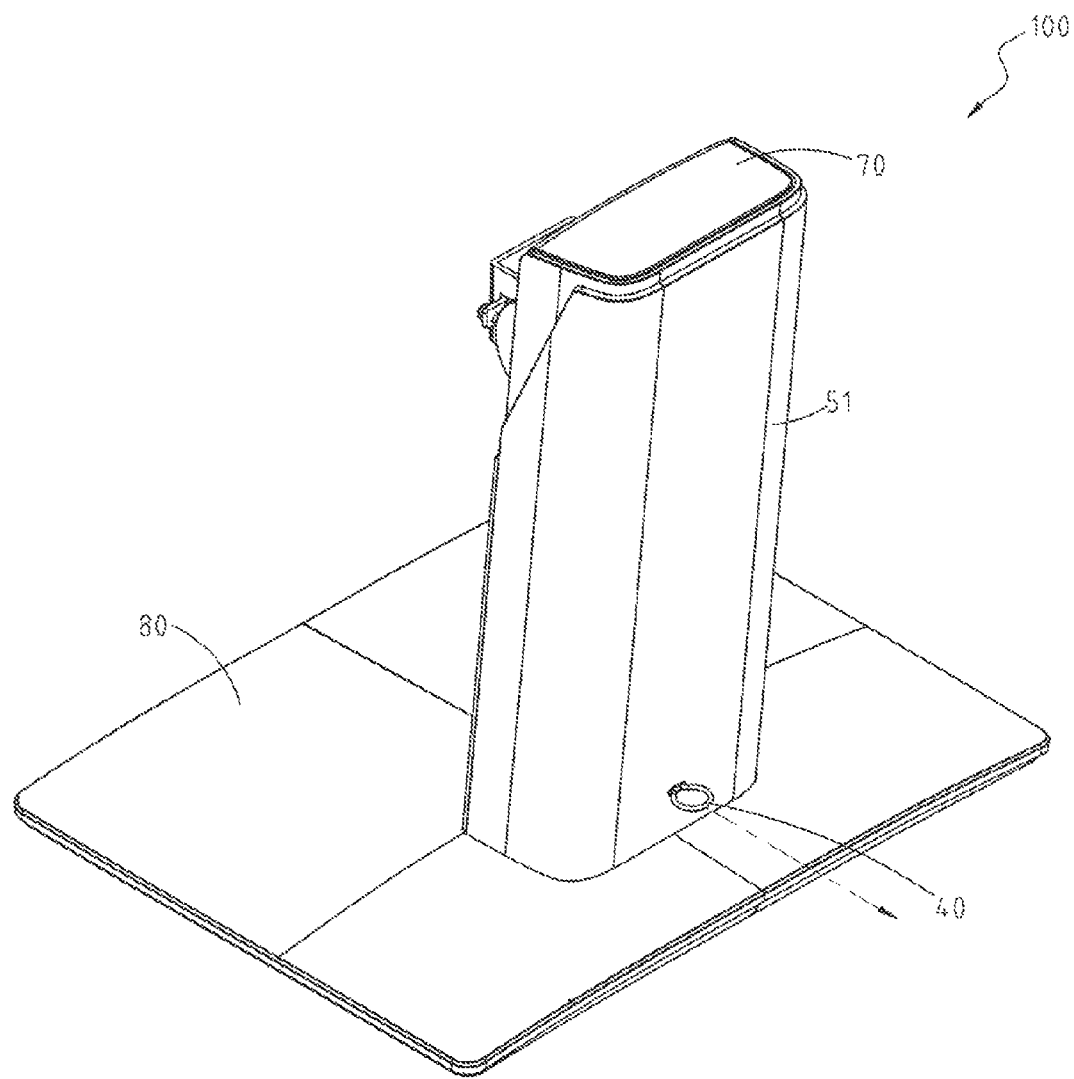
FIG. 8 is a rear perspective view of the lift stand for an embodiment of the instant disclosure.
Figure 9:
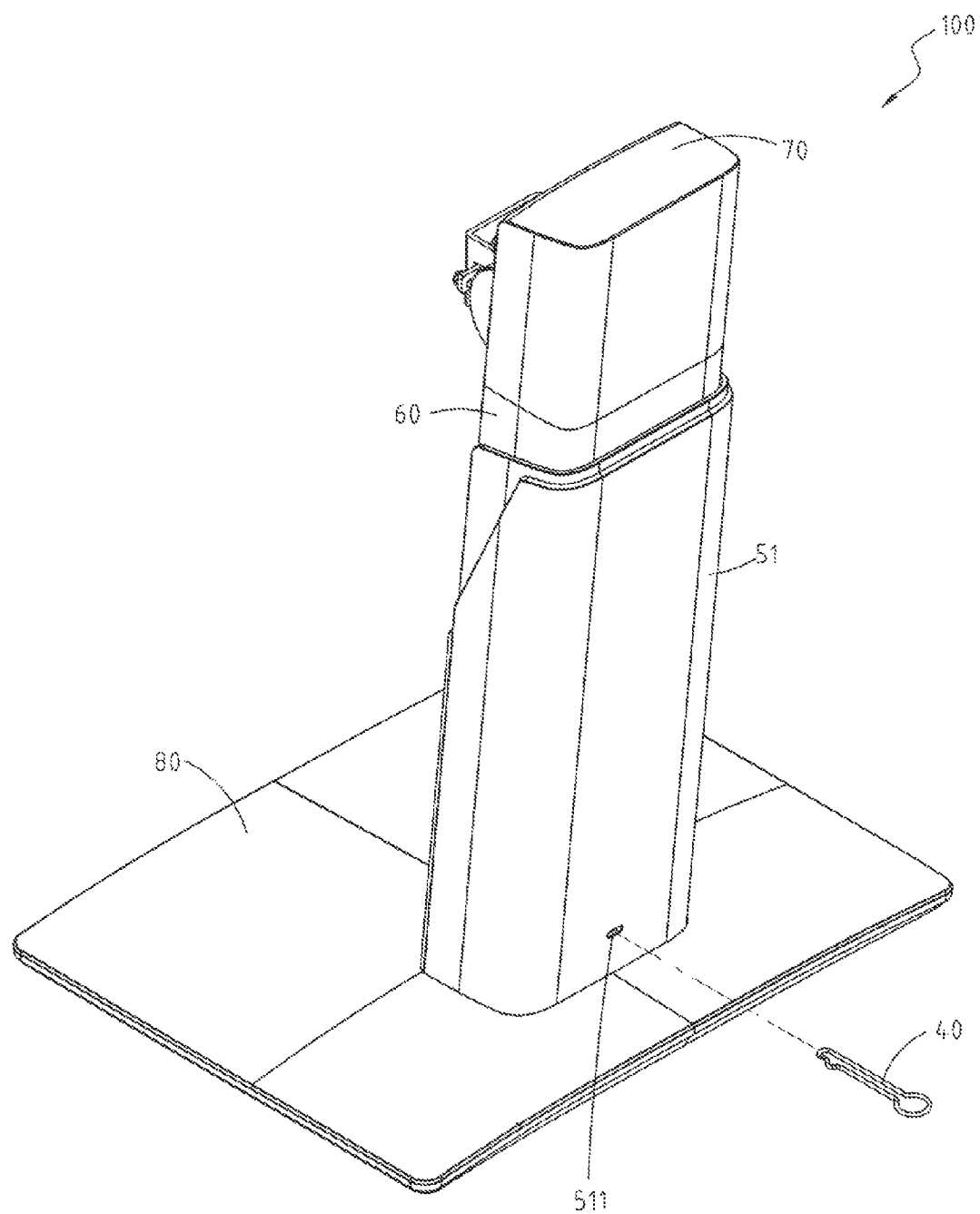
FIG. 9 is another rear perspective view of the lift stand for an embodiment of the instant disclosure.

Please refer to FIGS. 1~9. FIG. 1 is a schematic view of a lift stand in use for an embodiment of the instant disclosure. FIG. 2 is an exploded view of the lift stand, while FIGS. 3~4 are cross-sectional views thereof. FIGS. 5 and 6 are perspective views of a support structure and a sliding member, respectively, for the current embodiment. FIG. 7 is a schematic view of assembling the lift stand for the present embodiment, while FIGS. 8 and 9 are respective rear views of the lift stand. The lift stand 100 of the instant disclosure comprises a support structure 10, a sliding member 20, an elastic member 30, and a fixing member 40. As shown in FIG. 1, the lift stand 100 is capable of connecting to a display 200, so as to adjust the height of the display 200 by the user. FIGS. 1 and 3 further illustrate the display 200 that includes a mounting member 201, for connecting to the sliding member 20 of the lift stand 100.

Please refer to FIGS. 2 and 5. The support structure 10 includes a rectangular-shaped casing 11, at least one guide rail, and a first positioning hole 12 formed through the casing 11. For the present embodiment, the support structure 10 is equipped with two guide rails 13 and 14. The guide rails 13 and 14 are arranged parallelly and secured to the interior of the casing 11 by a plurality of first fastening members 15. Please refer to FIGS. 2 and 6. The sliding member 20 includes a main body 21, a bearing block 22, a fixing block 23, and at least one slide rail. For the present embodiment, the sliding member 20 is furnished with two slide rails 24 and 25. The bearing block 22 and the fixing block 23 are both fixed to the main body 21. The slide rails 24 and 25 are secured to opposite sides of the main body 21 by a plurality of second fastening members 26. As shown in FIG. 6, a second positioning hole 231 is formed through the fixing block 23.

The elastic member 30 is connected between the support structure 10 and the sliding member 20. A restoring force is provided by the elastic member 30 that enables the sliding member 20 to slidably move relative to the support structure 10. For the present embodiment, the elastic member 30 is a flat spiral spring fixed to the casing 11 of the support structure 10. When the sliding member 20 is slidably displaced against the support structure 10, the bearing block 22 of the sliding member 20 abuts the elastic member 30. An arched recess 221 is formed on the bearing block 22, so as to allow the elastic member 30 to stretch out or wind up evenly. The recess 221 is shaped to matingly receive the flat spiral spring, such that the bearing block 22 has a greater surface area for applying a force to the spring.

Please refer to FIGS. 1-2, 3 and 7. For hiding the internal parts of the lift stand 100 while in use, the lift stand 100 includes a shield 50 and a cover 60. The shield 50 may be a hollowed enclosure that wraps around the support structure 10.

Alternatively, such as for the present embodiment, the shield 50 includes a first shell 51 and a second shell 52. The first shell 51 fixedly encloses the casing 11 of the support structure 10. The first shell 51 also defines a third positioning hole 511 corresponding to the first positioning hole 12 of the casing 11. The second shell 52 is engaged to the first shell 51. As shown in FIG. 1, the shield 50, along with others, provides protective and aesthetic effect for the lift stand 100.

The cover 60 fixedly encloses the sliding member 20 and moves therewith. Please refer to FIG. 7. After the sliding member 20 has been assembled to the support structure 10, the cover 60 encloses the sliding member 20 in a top-to-bottom manner. Once the mounting member 201 is in position, a plurality of third fastening members 61 are used to pass through corresponding holes of the mounting member 201 and the cover 60, to secure the mounting member 201 and the cover 60 to the main body 21. As can be seen in FIG. 3, the cover 60 is received by the shield 50. As indicated earlier, since the cover 60 is fixed to the main body 21 of the sliding member 20, when the sliding member 20 is slid upwardly, the cover 60 would move therewith, as illustrated in FIG. 4. In other words, when the sliding member 20 is displaced upwardly, the user would only see the cover 60, without seeing various components of the sliding member 20.

Additionally, a cap 70 is fitted onto the cover 60, for enclosing the interconnected region between the mounting member 201 of the display 200 and the cover 60. The lift stand 100 may include a base 80. A locking member 81 is used to secure the support structure 10 onto the base 80, thus making the lift stand 100 more structurally stable.

Next, FIGS. 1~7 will be used to describe the assembling steps of the lift stand 100 for the present embodiment. To begin with, the first fastening members 15 are used to fix the guide rails 13 and 14 onto the inner surfaces of the casing 11. In particular, the guide rails 13 and 14 are parallelly arranged, which complete the assembling of the support structure 10. Next, the elastic member 30 is fixed to the casing 11, and the first shell 51 is fixed to the casing 11 from the rear of the support structure 10. The second fastening members 26 are used to secure the slide rails 24 and 25 parallelly on opposite sides of the main body 21. The bearing block 22 is fixed to the main body 21 in a bottom-to-top manner. The fixing block 23 is then fixed to the main body 21 to complete the assembling process of the sliding member 20.

Next, the sliding member 20 is disposed in the support structure 10. More specifically, for the sliding member 20, the slide rails 24 and 25 are slidably engaged with the guide rails 13 and 14, respectively, of the support structure 10. The bearing block 22 of the sliding member 20 also abuts the elastic member 30. A jig is used to push the sliding member 20 to the bottom of the support structure 10, as shown in FIG. 3. The fixing member 40 is passed through the third positioning hole 511 of the first shell 51, the first positioning hole 12 of the support structure 10, and the second positioning hole 231 of the sliding member 20. Thus, as illustrated by FIGS. 3 and 8, the lift stand 100 is configured at the retracted state. In other words, the position of the sliding member 20 is fixedly held by the fixing member 40.

The cover 60 is then fitted over the support structure 10 and the sliding member 20. The mounting member 201 of the display 200 is arranged above the cover 60, followed by fixing the cover 60 and the mounting member 201 to the sliding member 20 via the third fastening members 61. Such configuration implies the cover 60 and the mounting member 201 move together with the sliding member 20. Then, the second shell 52 is mated to the first shell 51, and the above-described assembled structure is disposed onto the base 80. A locking member 81 is used to interconnect the support structure 10 and the base 80. Lastly, the cap 70 is fitted upon the cover 60 to finish assembling the lift stand 100.

Figure 10:
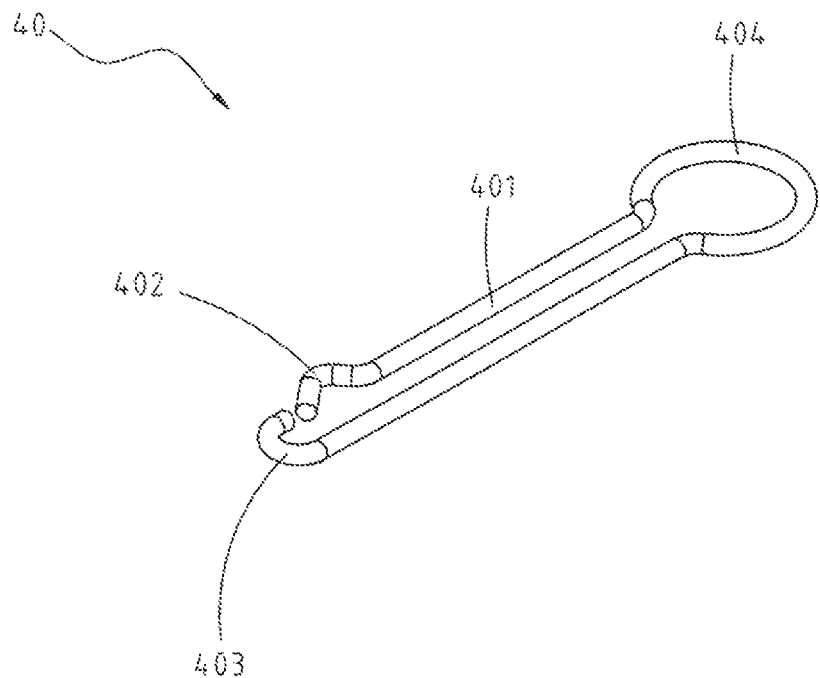
FIG. 10 is a perspective view of a fixing member for an embodiment of the instant disclosure.

Please refer to FIG. 10, which shows a perspective view of the fixing member 40 of the present embodiment. The fixing member 40 has a flexible arm 401, a restricting protrusion 402, and an inwardly curled end 403. The protrusion 402 is formed at one end of the flexible arm 401 and a ring portion 404 is formed on an opposite end thereof. The ring portion 404 allows the user to easily operate the fixing member 40. The protrusion 402 is formed in the vicinity of the curled end 403. The curled end 403 has a round portion, such that when the fixing member 40 is passing through various positioning holes, the insertion process can be done more easily. Furthermore, when the user removes the fixing member 40 from the lift stand 100, the round portion of the curled end 403 is less likely to inflict accidental injury.

The widths of the aforementioned positioning holes are slightly larger than the distance between the two parallel long sides of the fixing member 40. Therefore, when the fixing member 40 is in use, the protrusion 402 would abut the edge that defines the corresponding positioning hole. However, the flexible arm 401 is bendable, which enables the protrusion 402 to pass through the third positioning hole 511 of the first shell 51, the first positioning hole 12 of the support structure 10, and the second positioning hole 231 of the sliding member 20. Once the protrusion 402 of the fixing member 40 has passed through the second positioning hole 231, under the restoring force of the flexible arm 401, the protrusion 402 is returned to the original position abutting the fixing block 23. Such configuration prevents the fixing member 40 from being removed inadvertently or disengaging while shipping the lift stand.

When the user intends to remove the fixing member 40, for releasing the lift stand 100 from its fixed position, the user only needs to press down on the ring portion 404 of the flexible arm 401. The pressing action bends the flexible arm 401, which enables the protrusion 402 to re-pass through various positioning holes for removing the fixing member 40. For the instant disclosure, as shown in FIGS. 3 and 8, by the use of the fixing member 40 in passing through the positioning hole of each component of the lift stand 100, the lift stand 100 can be configured to occupy the least amount of space for packaging or storing purpose. Such attribute is achieved by using fewer structural components and requires less manufacturing processes. By doing so, the number of parts necessary to assemble the lift stand can be reduced, with more cost savings and less assembling time.

The description provided hereinafter would reference to FIGS. 3-4 and 8-9 to explain how the lift stand 100 works. For instance, after the lift stand 100 has been assembled and ready for packaging, for the purpose of minimizing package size to save space for shipping, the lift stand 100 needs to be configured at the fixed position shown in FIGS. 3 and 8. That is, the sliding member 20 is completely received by the support structure 10. Since the sliding member 20 is abutted to the elastic member 30, in order to keep the sliding member 20 inside the support structure 10, an external force must be applied to counter the restoring force of the elastic member 30. When the external force is taken away, the sliding member 20 would traverse upward in returning to its normal position (as shown in FIG. 4), under the restoring force of the elastic member 30. Therefore, to keep the sliding member 20 totally received by the support structure 10, when the sliding member 20 is slid to the bottom of the support structure 10, the fixing member 40 is needed to pass through the third positioning hole 511 of the first shell 51, the first positioning hole 12 of the support structure 10, and the second positioning hole 231 of the sliding member 20.

After the user has installed the display 200 and ready to adjust its height, the user only needs to remove the fixing member 40 in a direction shown by the arrow in FIG. 8. Since the weight of the display 200 is approximately the same as the restoring force of the elastic member 30, the balancing condition allows the height of the display 200 to be adjusted without using an extra fixing device. Thus, the lift stand 100 can be easily used in a straightforward manner, without tedious disassembling, adjusting, and fixing steps.

Please refer to FIGS. 4~6 and 9. When the display 200 is not installed on the lift stand 100, as the fixing member 40 is pulled out from the rear of the lift stand 100, the sliding member 20 reacts by sliding all the way to the top of the support structure 10. Such motion is due to the restoring force of the elastic member 30 and in the absence of the counter weight associated with the display 200. To keep the sliding member 20 from sliding off the support structure 10, the ends of guide rails 13 and 14 have are formed with limiting blocks 131 and 141, respectively. Correspondingly, the ends of the slide rails 24 and 25 are formed with barbs 241 and 251, respectively. Under the restoring force of the elastic member 30, the sliding member 20 would slide upwardly based on the orientation of the figures. The slide rails 24 and 25 would slide along the guide rails 13 and 14 until the barbs 241 and 251 are stopped by the limiting blocks 131 and 141, respectively.

Figure 11:
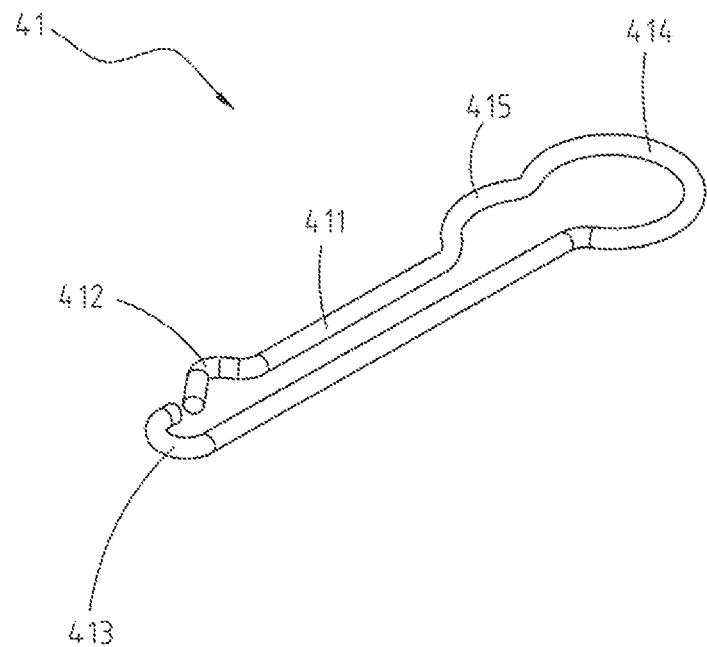
FIG. 11 is a perspective view of the fixing member for another embodiment of the instant disclosure.

Please refer to FIG. 11, which shows a fixing member 41 for another embodiment of the instant disclosure. For the present embodiment, only the fixing member 41 is different from the previous embodiment. All other elements remain the same and will not be elaborated herein. The fixing member 41 has a flexible arm 411, a restricting protrusion 412, a hook portion 413, a ring portion 414, and a pressing portion 415. The protrusion 412 is formed on one end of the flexible arm 411, and the pressing portion 415 is formed on another end of the flexible arm 411 opposite of the protrusion 412. The ring portion 414 is adjacent to the pressing portion 415. Different from the previous embodiment, the pressing portion 415 is incorporated to allow the user to press and bend the flexible arm 411 with more ease.

While the instant disclosure has been described by the way of example and in terms of the various embodiments, it is to be understood that the invention needs not be limited to the disclosed embodiments. Since any person skilled in the art may make modifications and improvements within the spirit and scope of the instant disclosure, the claimed scope of the instant disclosure is based on the appended claims of this specification.

What is claimed is:

1. A positionable lift stand, comprising:
   a support structure having a first positioning hole;
   a sliding member slidably connected with the support structure and includes a main body, a fixing block and a second positioning hole, the fixing block secured to the main body and the second positioning hole is formed on the fixing block;
   an elastic member connected between the support structure and the sliding member, the elastic member providing a restoring force to move the sliding member relative to the support structure; and
   a fixing member having a flexible arm, a restricting protrusion formed on one end of the flexible arm, and an arc-shaped pressing portion formed on another end of the flexible arm opposite of the restricting protrusion, the fixing member further having a curled portion integrally formed on a side of the fixing member opposite the flexible arm and near the one end near the restricting protrusion, wherein the curled portion terminates at a tip that is substantially adjacent to the restricting protrusion, and is configured to allow the fixing member to be more easily passed through the first and second positioning holes wherein after the fixing member movably passes through the first positioning hole and the second positioning hole, under a restoring force of the flexible arm, the restricting protrusion abuts against the fixing block, in response to pressure applied to the arc-shaped pressing portion, provides a bending force to bend the flexible arm and the restricting protrusion to move inward to enable the fixing member to be completely removed from the first positioning hole and the second positioning hole.

2. The positionable lift stand of claim 1, wherein the positionable lift stand is adapted to a display, and wherein the display is connected to the sliding member with the weight of the display being substantially the same as the restoring force of the elastic member.

3. The positionable lift stand of claim 2, wherein the display comprises a mounting member for connecting to the sliding member.

4. The positionable lift stand of claim 1, wherein the support structure comprises at least one guide rail, and wherein the sliding member includes at least one slide rail slidably engaged with the guide rail.

5. The positionable lift stand of claim 4, wherein the guide rail has a limiting block formed on one end thereof and the slide rail has a barb formed on one end thereof, and when the slide rail is slid to the end of the guide rail, the barb is abutted against the limiting block.

6. The positionable lift stand of claim 1, wherein the sliding member has an arched recess for abutting the elastic member.

7. The positionable lift stand of claim 6, wherein the elastic member is a flat spiral spring.

8. The positionable lift stand of claim 1, further comprising a shield disposed on the support structure, wherein the shield has a third positioning hole for passing through by the fixing member.

9. The positionable lift stand of claim 1, further comprising a cover enclosing and moving with the sliding member.

\* \* \* \* \*